US010037656B2

(12) United States Patent
Boudreau et al.

(10) Patent No.: US 10,037,656 B2
(45) Date of Patent: Jul. 31, 2018

(54) TECHNIQUES OF PERFORMING CLOUD-BASED HOSTING OF SHARED GAMING ACTIVITIES

(71) Applicant: IGT CANADA SOLUTIONS ULC, Moncton (CA)

(72) Inventors: Bradley Boudreau, Dieppe (CA); James William Morrow, Reno, NV (US)

(73) Assignee: IGT CANADA SOLUTIONS ULC, Moncton (CA)

( * ) Notice: Subject to any disclaimer, the term of this patent is extended or adjusted under 35 U.S.C. 154(b) by 294 days.

(21) Appl. No.: 14/702,872

(22) Filed: May 4, 2015

(65) Prior Publication Data

US 2016/0171828 A1 Jun. 16, 2016

Related U.S. Application Data

(63) Continuation-in-part of application No. 14/572,589, filed on Dec. 16, 2014, now Pat. No. 9,818,256.

(51) Int. Cl.
*G06F 17/00* (2006.01)
*G07F 17/32* (2006.01)

(52) U.S. Cl.
CPC ........ *G07F 17/3244* (2013.01); *G07F 17/323* (2013.01); *G07F 17/3223* (2013.01)

(58) Field of Classification Search
None
See application file for complete search history.

(56) References Cited

U.S. PATENT DOCUMENTS 5,611,730 A 3/1997 Weiss
6,287,199 B1 * 9/2001 McKeown .............. A63F 13/12 348/E7.071
2002/0123376 A1 9/2002 Walker et al.
2003/0181242 A1 * 9/2003 Lee ......................... A63F 13/12 463/42
2004/0009808 A1 1/2004 Gauselmann
2005/0086301 A1 * 4/2005 Eichler ................... A63F 13/12 709/204
2006/0116201 A1 6/2006 Gauselmann
2007/0060365 A1 3/2007 Tien et al.
(Continued)

OTHER PUBLICATIONS

International Search Report and Written Opinion dated Oct. 5, 2015 for International Application No. PCT/CA2015/050099.

*Primary Examiner* — Paul A D'Agostino
(74) *Attorney, Agent, or Firm* — Sage Patent Group

(57) ABSTRACT

According to some aspects, a method of operating a casino game is provided comprising obtaining indications of communication latency from the server to at least a first gaming device and a second gaming device, receiving first user input data from the first gaming device, the first user input data being indicative of a wager, determining an outcome for the first instance of the casino game based at least in part on the wager, and, based at least in part on the indications of communication latency from the server to the first and second gaming devices, sending first image data to the first gaming device through wired communication channels, the first image data including one or more visual indications of the outcome, and sending second image data to the second gaming device through at least one wireless communication channel.

16 Claims, 9 Drawing Sheets

(56) References Cited

U.S. PATENT DOCUMENTS

2008/0052704 A1* 2/2008 Wysocki .................. G06F 8/65 717/173
2008/0194333 A1* 8/2008 Zalewski ................ A63F 13/10 463/42
2008/0254897 A1 10/2008 Saunders et al.
2008/0268959 A1 10/2008 Bryson et al.
2009/0075736 A1* 3/2009 Kniberg .................. A63F 13/77 463/42
2009/0209333 A1 8/2009 Kelly et al.
2009/0270166 A1* 10/2009 Thukral ............ G06F 17/30038 463/25
2010/0227691 A1* 9/2010 Karsten ................... G07F 17/32 463/42
2011/0028203 A1 2/2011 Agarwal et al.
2011/0092278 A1 4/2011 Johnson
2012/0094744 A1* 4/2012 Parrinello ........... G07F 17/3283 463/25
2012/0157178 A1 6/2012 Lockton et al.
2012/0308192 A1* 12/2012 Chung ............. H04N 21/44218 386/230
2012/0309515 A1* 12/2012 Chung ................. H04N 21/274 463/31
2013/0194278 A1* 8/2013 Zajac, III ................ A63F 13/10 345/473
2014/0213368 A1* 7/2014 Jacob .................. G07F 17/3241 463/42
2014/0274347 A1* 9/2014 Alexander .......... G07F 17/3244 463/26
2014/0274380 A1* 9/2014 Kazama ................ A63F 13/355 3/355
2015/0375113 A1* 12/2015 Justice .................. A63F 13/355 3/355
2016/0059125 A1* 3/2016 Georgiev .............. A63F 13/216 463/31
2016/0171825 A1* 6/2016 Morrow .............. G07F 17/3225 463/42

* cited by examiner

TECHNIQUES OF PERFORMING CLOUD-BASED HOSTING OF SHARED GAMING ACTIVITIES

CROSS REFERENCE TO RELATED APPLICATIONS

The present application claims the benefit under 35 U.S.C. § 120 as a continuation-in-part of U.S. patent application Ser. No. 14/572,589, filed Dec. 16, 2014 and entitled "Techniques of Synchronizing Gaming Devices for Shared Gaming Activities," which application is hereby incorporated by reference in its entirety.

BACKGROUND

Interest in electronic and computerized implementations of casino gaming machines has increased in recent years. For example, slot machines historically were mechanical devices ("steppers") with physical reels that were spun by pulling a lever on the side of the machine that engaged driving gears, cogs and springs. Newer casino gaming machines are controlled by one or more computer processors that calculate outcomes of wagers provided to the machines. For example, a computer processer may randomly determine whether a wager is a winning or non-winning wager, and may additionally determine the value of a win. Additionally, or alternatively, a wager placed with a casino gaming machine may result in a win of a shared jackpot, such as a progressive jackpot. A progressive jackpot is one in which the value of the jackpot increases a small amount with each game that is played (e.g., played by any of a number of players). At the occurrence of a qualifying event, one of the players wins a jackpot, which may be the money present in the progressive jackpot pool or some other amount.

SUMMARY

The present application relates generally to techniques of synchronizing devices participating in a cloud hosted game.

According to some aspects, a method of operating a casino game at a plurality of gaming devices is provided, the method comprising by a server comprising at least one processor obtaining indications of communication latency from the server to at least a first gaming device and a second gaming device of the plurality of gaming devices, receiving first user input data from the first gaming device, the first user input data being indicative of a wager for a first instance of the casino game, determining an outcome for the first instance of the casino game based at least in part on the wager for the first instance of the casino game, and sending image data to at least the first and second gaming devices based at least in part on the indications of communication latency from the server to the first and second gaming devices, the sending comprising sending first image data to the first gaming device through wired communication channels, the first image data including one or more visual indications of the outcome for the first instance of the casino game, and sending second image data to the second gaming device through at least one wireless communication channel.

According to some aspects, a server system for operating a casino game playable at a plurality of gaming devices is provided, the server system comprising at least one communication interface configured to communicate with the plurality of gaming devices, at least one processor, and at least one processor-readable storage medium comprising processer-executable instructions that, when executed, cause the at least one processor to obtain indications of communication latency from the server to at least a first gaming device and a second gaming device of the plurality of gaming devices, receive first user input data from the first gaming device, the first user input data being indicative of a wager for a first instance of the casino game, determine an outcome for the first instance of the casino game based at least in part on the wager for the first instance of the casino game, and send image data to at least the first and second gaming devices based at least in part on the indications of communication latency from the server to the first and second gaming devices, the sending comprising sending first image data to the first gaming device through wired communication channels, the first image data including one or more visual indications of the outcome for the first instance of the casino game, and sending second image data to the second gaming device through at least one wireless communication channel.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
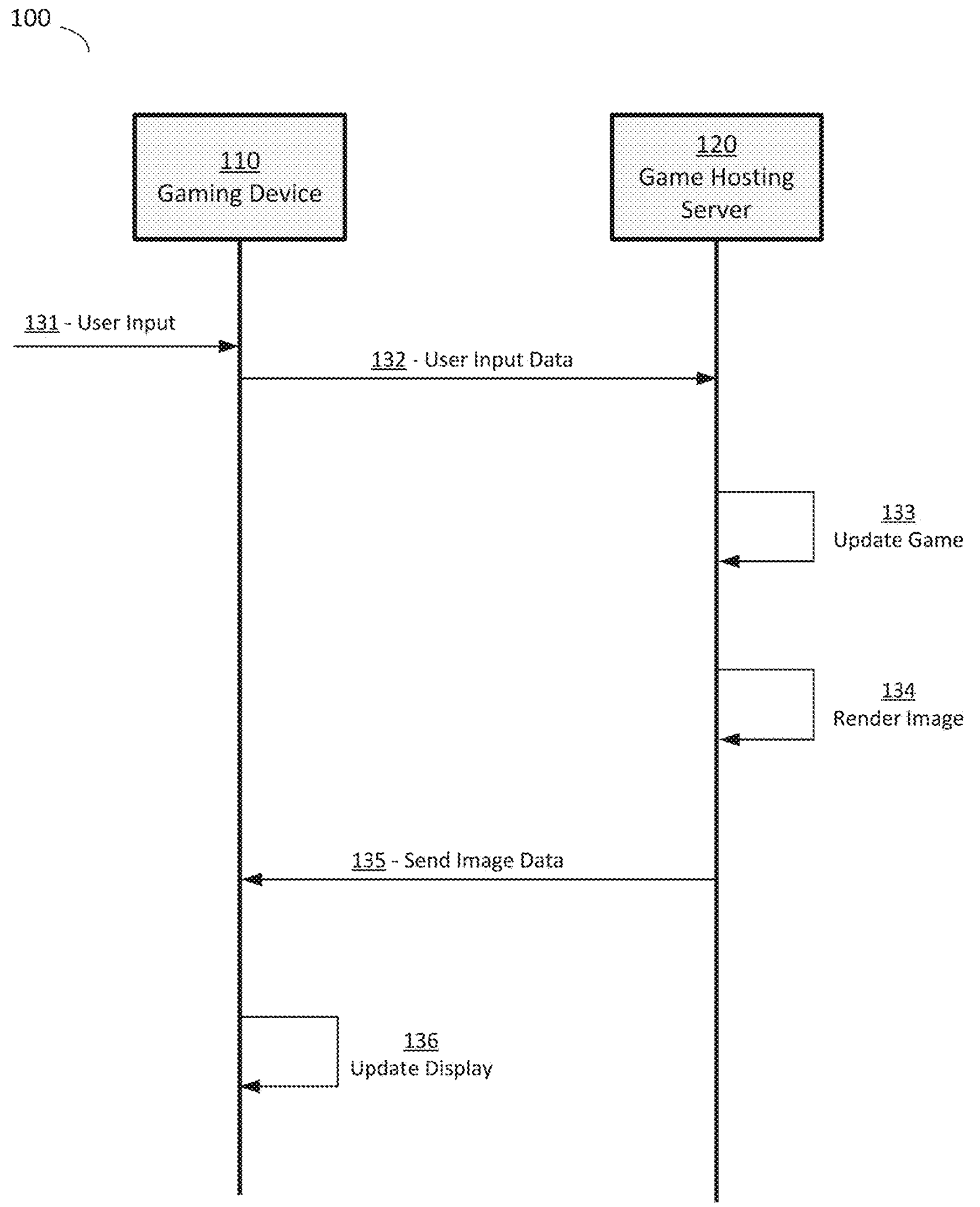
FIG. 1 depicts an illustrative process of hosting a game, according to some embodiments.

Gaming activities using non-casino devices, such as personal computers, cell phones, tablets and other mobile devices, have become more popular in recent years. Use of such devices in casino gaming may, however, introduce security concerns. A non-casino device could be "hacked" in a way that a casino gaming machine could not, such that the non-casino device may be able to spoof the winning of a prize. Thus, there may be concerns that a prize win may not be legitimate when reported by a non-casino device. Largely for this reason, devices not under some level of control by a casino have conventionally be excluded from gambling activities.

The inventors have recognized and appreciated that by operating the entirety of a casino game at a server, rather than within a device being used by a player, such security concerns may be alleviated and thereby any type of device may participate in gaming activities. The server may receive user input from a gaming device and in response render an image to be displayed on the gaming device. Data representing the image may be sent to the gaming device, and the gaming device renders the image on its display based on the received data. This approach in which user input data is sent to a server, and the server responds with image data (sometimes referred to as "cloud hosting" of a game) may avoid most, if not all, ways for a user to illegitimately manipulate a game due to the limited types of data being transmitted and received by the gaming device, and since all determinations of wins are made at the server and not within the gaming device. Since the game is hosted by the server, updates to the game may be easily performed without any additional action needed by any devices participating in the game. Protocols necessary for gaming devices to communicate with the server, and to receive image data from the server may also be simplified relative to approaches in which gaming devices operate at least part of a game on the gaming device.

While such an approach may offer the above-described advantages, however, non-casino devices tend to have much higher communication latencies with remote servers than can be provided for in a casino environment (e.g., because the devices connect to a remote server via the Internet, rather than using a dedicated, high speed connection to a nearby server). In cases where devices are participating in games independently of one another, this may not necessarily cause a concern since it will merely result in a time lag between a state of the game at the server and a state at the device, and casino games are generally of a type that can tolerate such delays (as contrasted with so-called "twitch" games, for example). However, in some cases casino games make use of shared gambling activities, such as progressive jackpots. Shared gambling activities are those in which one player's actions (e.g., a wager) might have one or more effects on one or more other players. Such activities demand (and are often required by law to provide) gambling outcomes to be substantially synchronized across participating gaming devices. If this were not the case, the server may perform actions outside of an intended sequence.

For example, where multiple players may place wagers toward the same prize, a determination of a win may be made before all wagers were received from the gaming devices, potentially leading to players missing out on winning a prize when they legitimately participated in a wager. Consequently, any gaming activities in which players actions might have one or more effects on one or more other players may be impractical when using the cloud hosting approach to operating a casino game, since there is no guarantee that players of the game, who may be connecting to a server via numerous types of devices with different latencies, will be aware of a current state of a game.

The inventors have recognized and appreciated that, by using techniques to compensate for latency, a server may operate a cloud hosted game in a synchronized fashion for numerous gaming devices that exhibit a wide range of communication latencies. Image data may be sent by the server to the gaming devices in such a way as to ensure substantial synchronization in the shared gaming activity amongst the devices. Accordingly, techniques for hosting a game at a server and synchronizing participating gaming devices have been developed. Thereby, a wide range of gaming devices, such as casino gaming machines, personal computers and mobile devices, may collectively participate in shared gaming activities that involve wagering, such as progressive or other jackpots. Each type of gaming machine may be perceived by players as being equally fair in terms of the chances of winning jackpots since participation in such jackpots is suitably synchronized using techniques described herein.

According to some embodiments, a state of an instance of a game may be stored by a game hosting server. The server may manage numerous instances of the same game. By storing the state of the game instance, a user playing with that instance may resume their game from any suitable device, which may not necessarily be the same device that instantiated the game instance. For example, a user may begin playing a casino game hosted at a server using a mobile device, may stop playing using the mobile device, then may continue playing using a tablet device. A state of an instance of a game stored by a server may be associated with unique information associated with the user who created the instance, such a user account identifier or other suitable information.

According to some embodiments, a server may render an image to be displayed on a gaming device based on display characteristics of the gaming device. For example, the image may be rendered with a particular display resolution (being the number of distinct pixels to be displayed in each direction). In some cases, the server may receive an indication of the type of device being used to play a casino game and may render the image based on this indication.

According to some embodiments, devices participating in a cloud hosted game are synchronized by selecting a time to transmit an indication of a shared event on a device-by-device basis. The indications of a shared event may be sent from a server or otherwise such that they arrive at substantially the same time at each device. In some embodiments, a server may measure the latency of one or more network hops between the server and each participating device such that transmissions to the participating device may be timed to arrive at their respective destinations at substantially the same time.

According to some embodiments, gaming devices participating in a cloud hosted game may place wagers using non-cash currencies. Where non-casino gaming devices (e.g., mobile phones, personal computers, etc.) are participants in a shared gaming activity, the types of currencies that may be used for a particular activity may be wider ranging than those that might traditionally have been used in casino gaming. For example, reward points associated with any suitable credit-based loyalty program may be used as a currency, which may include air miles, casino rewards (e.g., Total Rewards), etc.

Following below are more detailed descriptions of various concepts related to, and embodiments of, techniques of synchronizing devices participating in a cloud hosted game. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 depicts an illustrative process of hosting a game, according to some embodiments. In process 100, a gaming device 110 is participating in a game hosted by game hosting server 120. As discussed above, in a so-called "cloud hosted" approach to operating a game, a gaming device may provide user input data to the game hosting server which provides image data to the gaming device. In the example of FIG. 1, an instance of a game (e.g., a casino game) is being executed by the game hosting server and the server stores data associated with this instance. The server 120 may store data associated with numerous instances of the same game in addition to instances of other games.

The game in which gaming device 110 is participating may include any game, including any casino game, in which one or more displays present images (e.g., to a user of the gaming device). The images may, or may not, include one or more touch interfaces. That is, the image(s) displayed by gaming device 110 may be purely informational or may include one or more elements that may be manipulated by a user through touch input or other direct manipulation. For example, gaming device 110 may be a casino gaming machine that includes a display yet users provide user input only through activation of one or more mechanical buttons and/or levers separate from the display. Alternatively, gaming device 110 may be a tablet device through which users provide touch input to the display of the device. Gaming device 110 may include any number of any type of displays.

Gaming device 110 may include any suitable device on which a gaming application may be executed, including but not limited to: casino gaming machines, personal computers, laptops, mobile devices (e.g., tablets, phones, etc.), lottery machines, or combinations thereof. The gaming device may receive any type of user input 131, which may include touch input (e.g., from a user via a touch screen or other touch interface), activation of one or more mechanical buttons, switches and/or levers, cash being inserted into a receptacle of the gaming device, a card (e.g., a credit card, gaming rewards card, etc.) being read by the gaming device (e.g., by swiping the card against a reader, by inserting the card into the device, etc.), or combinations thereof.

In response to receiving user input 131, the gaming device 110 may generate user input data 132 which indicates, at least in part, the user input received by the device. This user input data is sent to the game hosting server to indicate to the server both the type of user input provided as well as the specific details of the user input. For example, the user input may comprise touch input to a touch screen of the gaming device. The data generated by said touch input within the gaming device may be used to construct user input data that may, for example, indicate that touch input was received in addition to a position on the touch screen at which the touch occurred.

User input data 132 may be formatted in a manner consistent across different types of gaming devices, such that whereas different gaming devices (e.g., tablets, casino machines, etc.) may utilize similar input mechanisms, the user input data provided to game hosting server 120 by each device may be of the same format. For example, a touch sensor within a tablet may be of a different size and type (e.g., capacitive or resistive) than a casino gaming machine's touch screen, yet user input data sent from either to the game hosting server 120 may include data in the same format, such as coordinates within the display at which touch was sensed in a common format.

Game hosting server 120 may receive the user input data 132 and in response may perform an update to the game 133. Since game hosting server may execute multiple games, each potentially having multiple instances active at one time, the server may identify, from the user input data, to which game and which instance the user input data refers. The user input data may identify the instance and/or game in any suitable manner, such as by including authentication information for an account with which the instance and/or game is associated, by including a unique identifier associated with the instance, etc.

Once the instance has been identified, the update to the game 133 is performed. This may include determining the context of the user input data and taking action within the game accordingly. The type, and details of, the user input data may be mapped to a meaning within the game, which may cause the game to be updated in response. For example, user input data may indicate a mechanical level pull that the game hosting server interprets as indicating a wager is to be placed. The game may then be updated to indicate the wager has been placed and/or to indicate a result of placing the wager. As another example, user input data may indicate touch input at a location within a user interface of the game being played. The game hosting server may associate a region of the user interface in which the touch input was detected with a particular function, and may update the game based on activation of this function.

According to some embodiments, the user input data 132 indicates a wager is to be placed within a casino game being executed by the game hosting server. In some cases, game hosting server 120 maintains an account balance for the user playing the game and debits an amount equal to the wager after identifying that the wager has been placed. In response to a wager, the game hosting server may make a determination of whether the wager results in a prize to the player or not. In some cases, determination that a prize has been awarded results in a credit to an account balance maintained by the server.

Once the game has been updated, an image associated with the instance of the game is rendered by the game hosting server 120. The image may be rendered based on the type of device represented by gaming device 110. This may include rendering an image to match a display resolution of a display of gaming device 110 and/or to match available colors of a display of gaming device 110 (e.g., if the display has a limited selection of colors for display).

In some cases, an image is rendered only for a portion of a display of the gaming device. If only a portion of the display is determined to be changed by the update to the game 133, for example, it is unnecessary to send image data for the remainder of the display since those pixels are unchanged. Accordingly, in some cases the image data may comprise data corresponding to some pixels of the display without including data corresponding to other pixels of the display.

According to some embodiments, the image associated with an instance of a game may include one or more indications of an outcome of the game. For example, where the game hosting server determines whether a not a wager results in a prize to a player (e.g., to the player placing the wager or to a progressive jackpot winner), the image may include visual data that conveys the outcome (e.g., win, loss) to the player. The indication may be represented by any combination of graphical data, including pictures and/or text, that convey the gaming outcome to the player. An outcome of the game may include any outcome that is a result of the user input data 132 being provided to the game hosting server, and is not limited to win or loss outcomes. For example, user input data that indicates placing of a wager may cause the game hosting server to produce images to be displayed by the gaming device while the effects of the wager (e.g., win or loss) is/are being determined. Such images may thereby provide visual information to a user of the gaming device that indicates they should wait for the server to provide a further indication or a win or a loss at a subsequent time (e.g., images of a slot machine reel spinning).

Once the image is rendered, game hosting server 120 produces image data from which the gaming device 110 will be able to reconstruct the image. In some cases, the image data is simply the image itself in a suitable format. In other cases, the image may be compressed, encrypted and/or otherwise altered from a direct representation of pixel values. Upon receipt of the image data, the gaming device 110 updates a display of the gaming device to display the image received. In some cases, the gaming device 110 may decrypt and/or uncompress the image data to obtain the image for display.

According to some embodiments, the gaming device 110 may provide additional data to the game hosting server aside from the user input data. Such data may include authentication information (e.g., so that a user may securely establish their credentials at the server in order to play the game).

It will be appreciated that, while game hosting server is shown in the figure as a "server" and is discussed as such above, the above-described process may be performed by any number of physical machines, such as a cluster of connected servers, as the techniques described herein are not limited in this manner.

Figure 2:
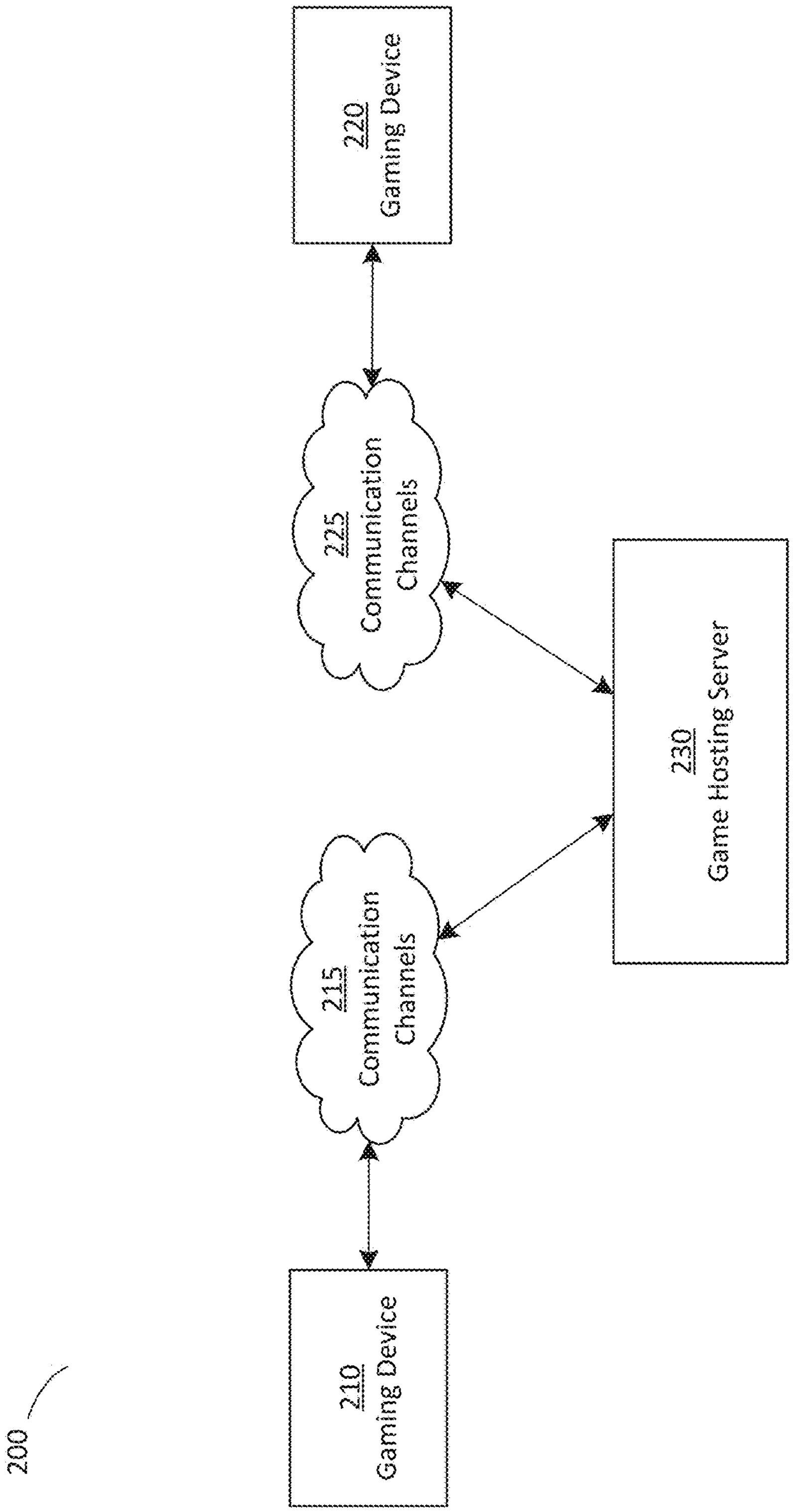
FIG. 2 depicts an illustrative system suitable for practicing techniques for synchronizing devices participating in a cloud hosted game, according to some embodiments.

FIG. 2 depicts an illustrative system suitable for practicing techniques for synchronizing devices participating in a cloud hosted game, according to some embodiments. As discussed above, embodiments provide for a wide range of devices to collectively participate in a shared gaming activity within a cloud hosted game. System 200 illustrates one such system in which two gaming devices 210 and 220 participate in a shared gaming activity by communicating with game hosting server 230, which coordinates the activity. Each of the gaming devices 210 and 220 provide user input data to the game hosting server and, in response, game hosting server 230 may send image data to each of the gaming devices. Gaming device 210 and/or 220 may, for example, be used as gaming device 110 shown in FIG. 1 with game hosting server 230 being used as game hosting server 120 shown in FIG. 1.

Game hosting server 230 may coordinate any suitable shared gaming activity by sending and/or receiving data (which may include receipt of user input data and/or sending of image data) to/from gaming devices 210 and 220. Any number of gaming devices may participate in the cloud hosted game, and illustrative gaming devices 210 and 220 are depicted in system 200 merely as examples. According to some embodiments, game hosting server 230 may coordinate a shared gaming activity in which gaming outcomes are temporally tightly linked to actions of participants. For example, the shared gaming activity may include activities in which outcomes are to be provided to participants within a small time window after an action by a participant (e.g., a time window of less than three seconds, less than one second and/or less than a hundred milliseconds).

Gaming devices 210 and 220 may include any suitable device on which a gaming application may be executed, including but not limited to: casino gaming machines, personal computers, mobile devices (e.g., tablets, phones, etc.), lottery machines, entertainment systems provided within a vehicle such as a cruise ship, aircraft or automobile, or combinations thereof. According to some embodiments, gaming devices 210 and 220 are different types of gaming devices, for instance gaming device 210 may be a casino gaming device and gaming device 220 may be a mobile device.

Gaming devices 210 and 220 may each communicate with game hosting server 230 via communication channels 215 and 225, respectively, which may include any number of wired or wireless communication channels. As used herein, the term "communication channel" refers to a logical or physical link between devices. According to some embodiments, gaming devices 210 and/or 220 may communicate with server 230 via only wired communication channels. For example, a gaming device may be a casino gaming device and may communicate with a local casino controller (e.g., a floor controller) via a first wired communication channel, which communicates with a casino server via a second wired communication channel, which communicates with server 230 via a third wired communication channel. This is merely one such example of a series of wired communication channels between a gaming device and server 230, however, as any suitable collection of communication channels may generally be used. According to some embodiments, gaming devices 210 and/or 220 may communicate with server 230 via at least one wireless communication channel. For example, a gaming device may communicate with server 230 via a local wireless device, such as a router. According to some embodiments, gaming devices 210 and/or 220 may communicate with server 230 via the Internet.

According to some embodiments, gaming devices 210 and 220 may send user input data that is interpreted by the game hosting server 230 to indicate placing of a wager. According to some embodiments, game hosting server 230 may determine an outcome of a shared gaming activity. For example, an outcome may include determining one or more prizes to be given to one or more participants in the shared gaming activity. Such a determination may be made in response to received indications of wagers from one or more participants, at times when a particular event or events occur, and/or otherwise.

According to some embodiments, server 230 may send image data that represents display of an indication of an outcome of a shared gaming activity to gaming devices 210 and/or 220. For example, when a recipient of a prize for a shared jackpot is determined, an indication of a win may be depicted within the image data sent to the recipient's gaming device, and in some cases, an indication of a non-win may also be depicted in image data sent to one or more other gaming devices.

According to some embodiments, game hosting server 230 may measure latencies of communication between the server and each of gaming devices 210 and 220. This may include a measurement of the total latency (e.g., time to destination and/or round trip time) and/or may include measurements of latency for one or more network hops between the server 230 and the respective gaming device. Such measurements may be made a number of times (e.g., periodically) such that an average measurement may be obtained and/or so that a recent estimate of the latency of communication may be obtained.

According to some embodiments, server 230 may perform tracking of players participating in a cloud hosted game via gaming devices such as gaming devices 210 and 220. This may include authentication of user credentials with the server to identify a player (e.g., which may allow the player to access previously stored funds), and/or to log gaming activities of users over time.

Figure 3:
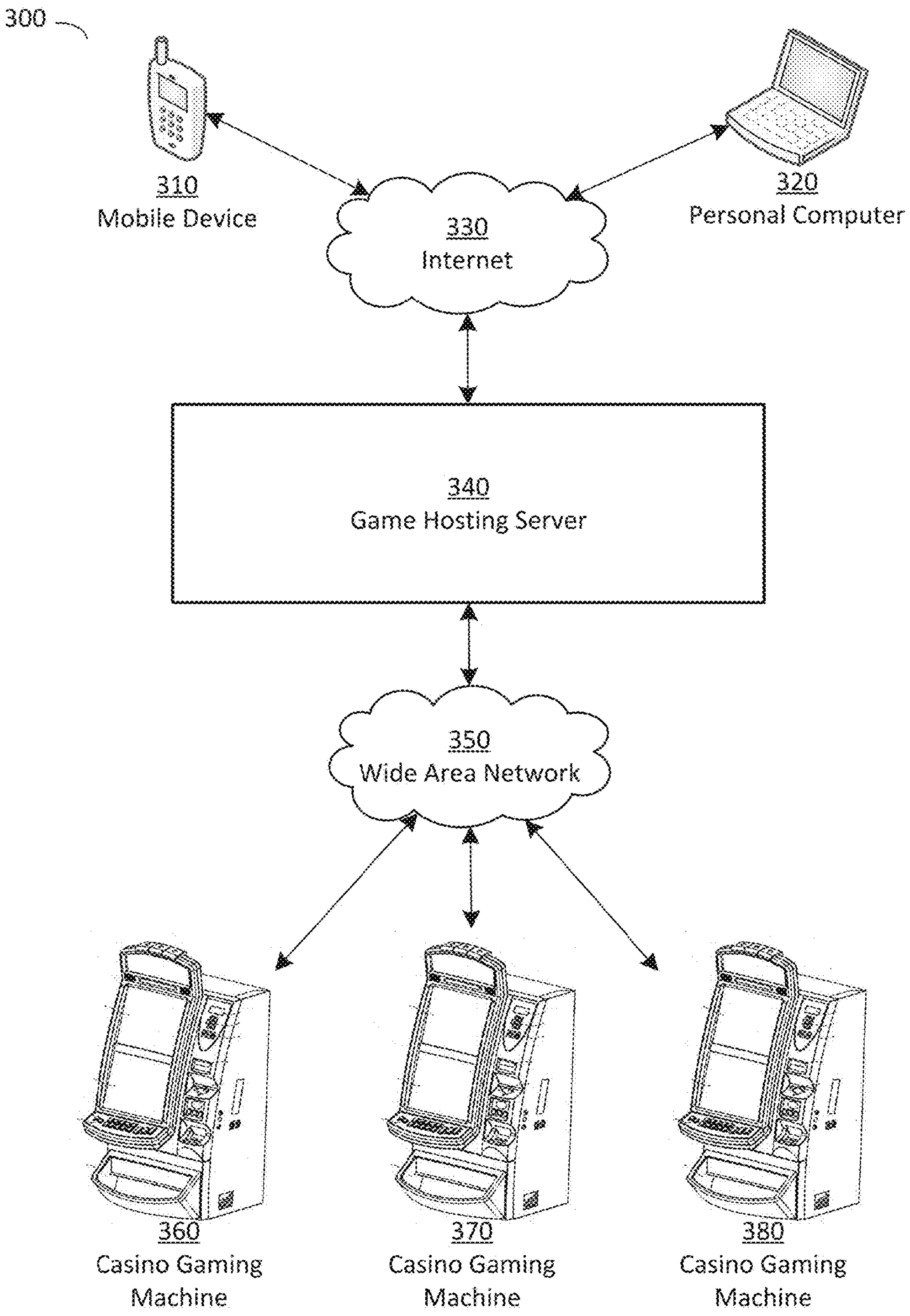
FIG. 3 depicts an illustrative system in which several devices participate in a shared gaming activity via a game hosting server, according to some embodiments.

FIG. 3 depicts an illustrative system in which several devices participate in a cloud hosted game via a game hosting server, according to some embodiments. System 300 includes five gaming devices, namely mobile device 310, personal computer 320 and casino gaming machines 360, 370 and 380. It will be appreciated that, in general, a system may include any number of any type of gaming devices, and that system 300 includes these five illustrative gaming device merely as one example of such a system. Game hosting server 340 coordinates one or more shared gaming activities in which gaming devices 310, 320 and 360-380 participate.

In the example of FIG. 3, mobile device 310 and personal computer 320 communicate with server 340 via the Internet, whereas casino gaming machines 360-380 communicate with server 340 via a wide area network 350. As discussed above, techniques described herein may be used to synchronize gaming devices when participating in a cloud hosted game. Accordingly, system 300 may be configured, using the techniques described herein, to provide image data to gaming devices 310, 320 and 360-380 at substantially the same time even though the communications latency between devices 310 and 320 with server 340 may be expected to be significantly greater than the latency of devices 360-380 with the server.

Mobile device 310 may include any suitable handheld computing device, including any tablet, mobile phone, PDA, etc. Personal computer 320 may include any general purpose computer. Mobile device 310 and personal computer 320 may each include one or more dedicated applications that provide access to a cloud hosted game coordinated by game hosting server 340.

According to some embodiments, mobile device 310 and/or personal computer 320 may provide authentication credentials to game hosting server 340 to identify a user accessing the respective device. For example, software executed by a device that provides access to the cloud hosted game may request login information for a user, and this login information may be authenticated by game hosting server 340 or otherwise before providing access to the activity. Game hosting game hosting server 340 may perform tracking of users participating in the shared gaming activity, as discussed above, which may include tracking account balances, a state of a game instance, etc.

Casino gaming machines 360, 370 and 380 may include any gaming machines located within a casino or within different casinos. An example of such a gaming machine is discussed below in relation to FIG. 7. The casino gaming machines 360-380 may communicate with game hosting server 340 via wide area network 350, which may be connected to one or more local area networks in which one or more of the casino gaming machines are located. For example, the casino gaming machines 360-380 may be part of a casino's local area network, which has a local controller through which the devices communicate with the wide area network and game hosting server 340.

According to some embodiments, gaming devices 310, 320 and 360-380 may send user input data to game hosting server 340. The user input data may be sent from each device using the same, or using different message protocols and/or message data formats. For example, an application executing on mobile device 310 may produce user input data having a first message data format and may transmit the user input data to game hosting server 340 using a first message protocol. Casino gaming device 360, on the other hand, may produce user input data using a different message data format and/or may transmit its user input data to game hosting server 340 using a different message protocol. Game hosting server 340 may accordingly be configured to receive and interpret messages provided via any of multiple message protocols and/or in any of multiple message data formats.

According to some embodiments, game hosting game hosting server 340 may determine an outcome of a shared gaming activity, such as a progressive jackpot or a lottery prize. The server may send image data depicting the determined outcome to any one or more of gaming devices 310, 320 and 360-380, and may do so based on message data formats and/or message protocols being used by the destination gaming device, as discussed above.

According to some embodiments, game hosting server 340 may perform one or more techniques for synchronizing the server with gaming devices 310, 320 and 360-380, including but not limited to, measuring latencies of communication between the game hosting server 340 and one or more of gaming devices 310, 320 and 360-380.

Figure 4:
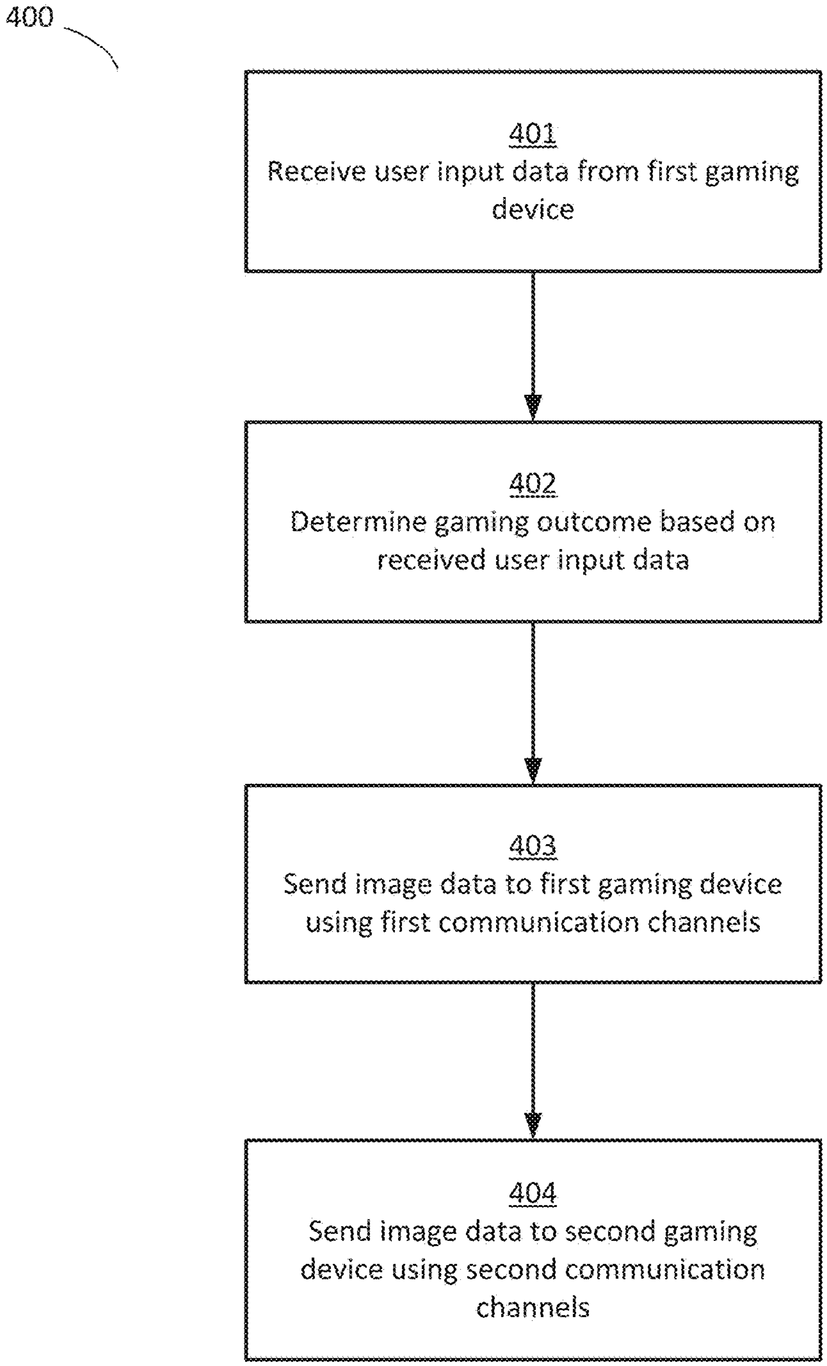
FIG. 4 is a flow chart of an illustrative method of synchronizing a shared gaming activity with multiple devices by a game hosting server, according to some embodiments.

FIG. 4 depicts an illustrative method of synchronizing a shared gaming activity with multiple devices by a game hosting server, according to some embodiments. Method 400 may be performed by a game hosting server coordinating one or more shared gaming activities, such as game hosting server 230 shown in FIG. 2 and/or game hosting server 340 shown in FIG. 3. This may include multiple instances of the example of FIG. 1 in which multiple gaming devices are providing user input data and receiving image data from the game hosting server, as discussed above.

In act 401, user input data is received from a first gaming device. The user input data may indicate one or more actions taken by a player at the first gaming device. In some cases, the user input data may represent a wager being placed at the first gaming device.

In act 402, the game hosting server determines at least one gaming outcome based on the user input data received in act 401. Where the user input data represents placing of a wager, gaming outcomes may include whether the wager resulted in a prize win or not, and/or may include making a change to a shared prize pool, such as a jackpot. For example, user input data representing placing of a wager may both result in a prize to the user and an increase in a progressive jackpot amount. In some cases, the user input data may represent something other than placing of a wager, such as an account login step, a balance query, an adjustment of a wager amount, etc. In such cases, the gaming outcome may include any adjustment to the functioning of the game that such user input may cause (e.g., accessing a user's account, updating a stored state of game instance, etc.).

In act 403, image data is sent to the first gaming device using first communication channels. The image data may, in some cases, be based upon the gaming outcome determined in act 402. For example, the determination that a prize is awarded to a player may cause an indication of this win to be depicted by an image represented by the image data. In other cases, welcome messages may be depicted subsequent to an account login being determined as a gaming outcome in act 402, or an account balance may be displayed subsequent to an account balance query being determined as a gaming outcome in act 403.

According to some embodiments, sending of the image data in act 403 may be performed based on a measure of communication latency between the server executing method 400 and the first gaming device. For example, sending of the status may be timed based on the latency so as to arrive at the first gaming device at a particular time. Sending of the status in act 404 is performed via first communication channels, which may include any number of wired and/or wireless communication channels.

In act 404, image data is sent to a second gaming device using second communication channels. The image data may represent a second instance of the same game being played at the first gaming device, but by a different player accessing the game at a different physical device (though which may be of the same type of device as the first gaming device). According to some embodiments, sending of the image data in act 404 may be performed based on a measure of communication latency between the server executing method 400 and the second gaming device. For example, sending of the status may be timed based on the latency so as to arrive at the second gaming device at a particular time. Sending of the status in act 406 is performed via second communication channels, which may include any number of wired and/or wireless communication channels.

According to some embodiments, the first and second gaming devices to which image data is sent in acts 403 and 404 may be different types of gaming devices. For example, the first gaming device may be a casino gaming machine and the second gaming device may be a mobile device. According to some embodiments, the first and second communication channels are a different set of communication channels. For example, the first communication channels may include at least one wireless communication channel whereas the second communication channels may be composed only of wired communication channels.

Figure 5A:
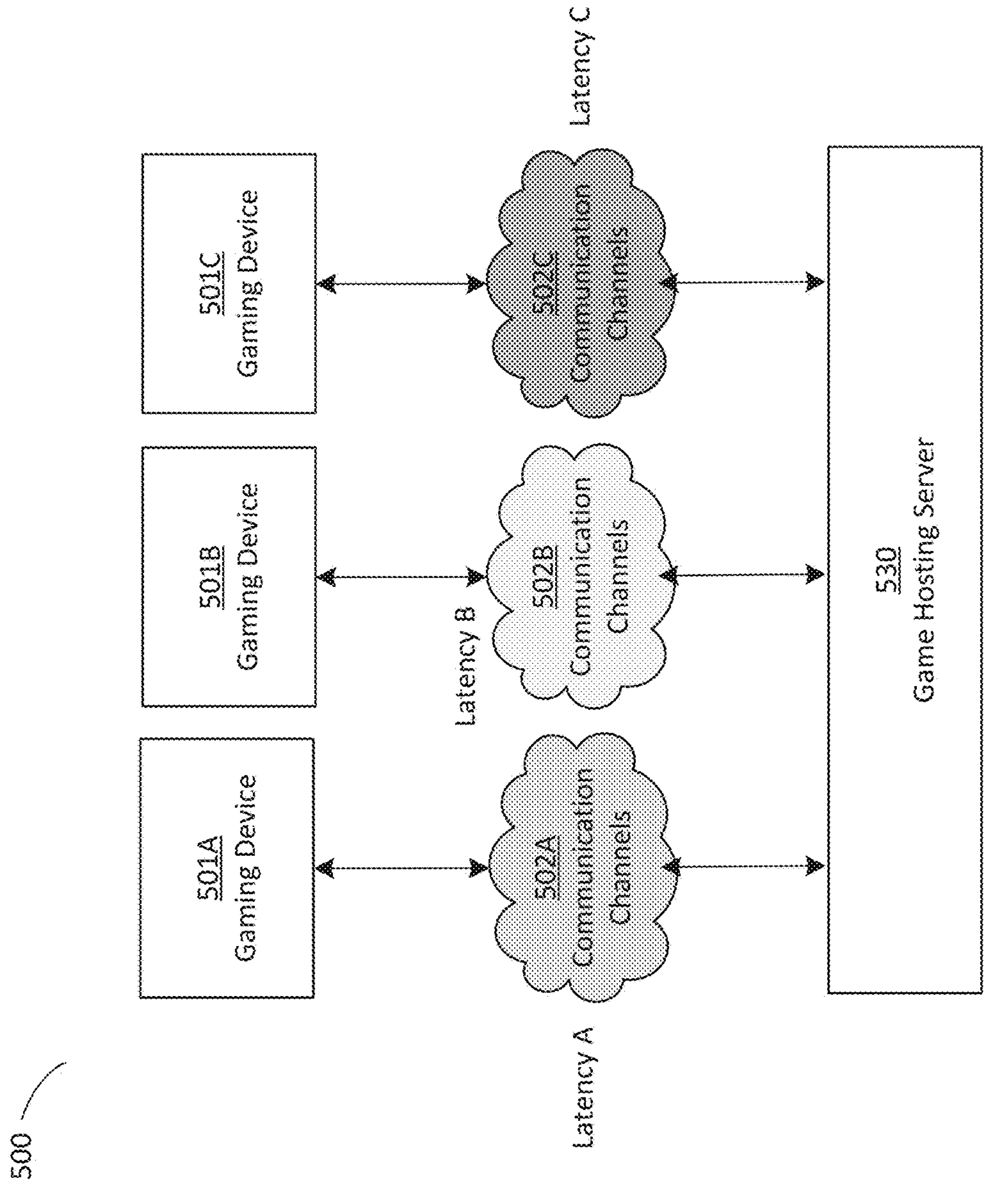
FIGS. 5A-C depict illustrative techniques of synchronizing devices participating in a cloud hosted game based on the latency of each device, according to some embodiments.
Figure 5B:
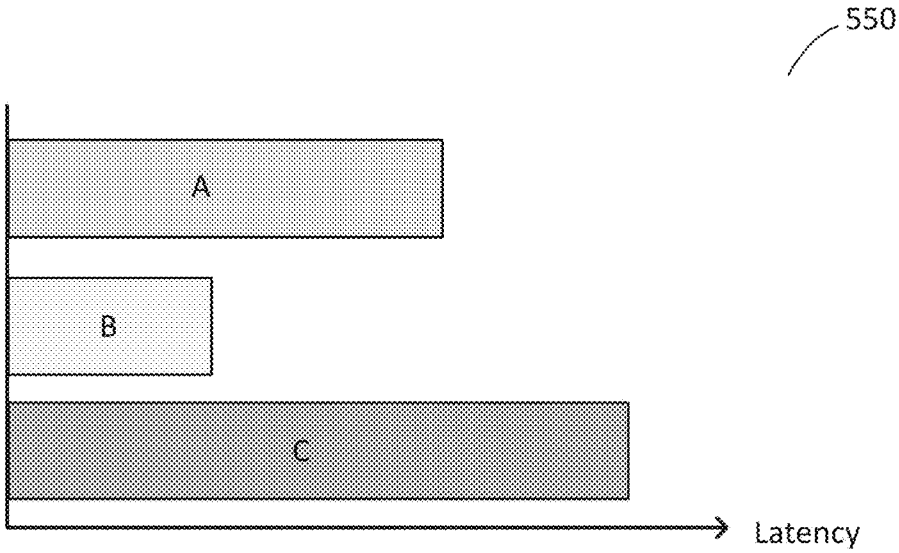
Figure 5C:
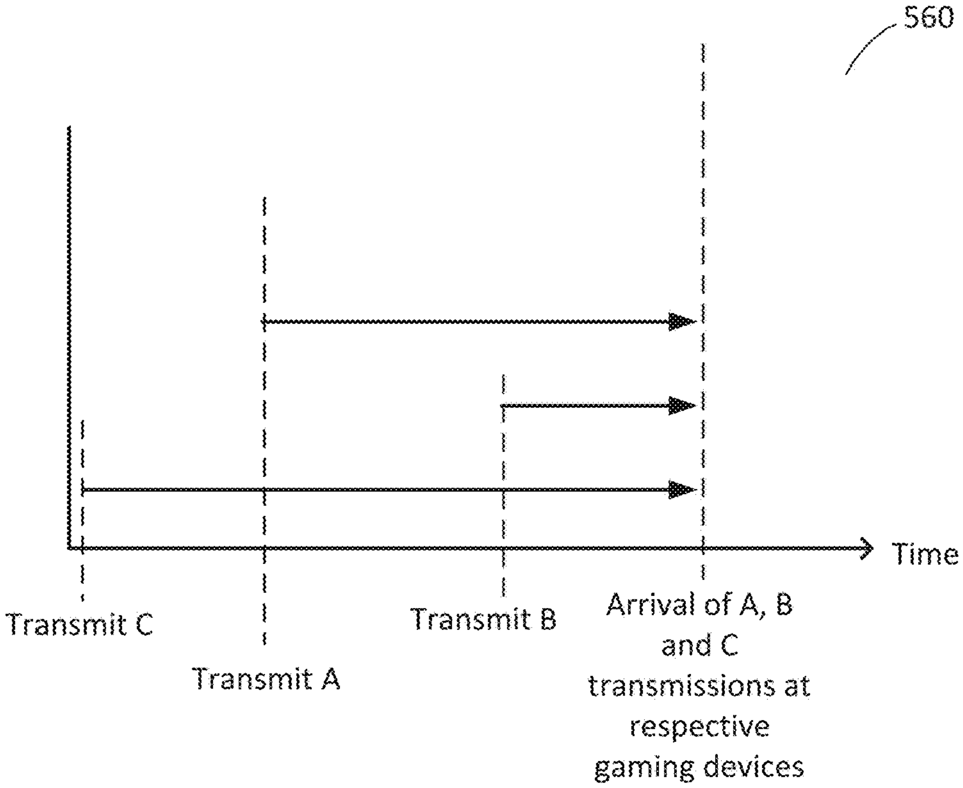

As discussed above, the inventors have recognized and appreciated that one technique for synchronizing devices participating in a cloud hosted game may be performed by measuring the communication latency of the devices. FIGS. 5A-C depict illustrative techniques for synchronizing such devices based on the measured latency of each device, according to some embodiments. System 500 shown in FIG. 5A illustrates three gaming devices 501A-C which communicate with a game hosting server 530 via respective sets of communication channels 502A-C. Each set of communication channels, which may each include any number of wired and/or wireless communication channels, is associated with a latency that represents the time for communication to propagate from the server to a respective gaming device (one-way latency).

The latencies of each set of communication channels 502A-C may have been determined in any suitable way, including by measuring the one-way and/or round-trip latencies between a respective gaming device and the server 530 any number of times. For example, each of latencies A, B and C used in the example of FIGS. 5A-C may represent a minimum observed one-way latency, a maximum observed one-way latency or an average observed one-way latency from the server 530 to a respective gaming device based on some number of latency measurements. Latencies may be measured by server 530 or otherwise using any suitable tool and/or technique, including but not limited to ping, paketto, traceroute, NetPerf, etc.

Latencies A, B and C used in the example of FIGS. 5A-C are shown in FIG. 5B. Latency C has the highest value of the three illustrative latencies, and latency A the lowest value. That is, communication from server 530 to gaming device C takes the longest amount of time, whereas communication from server 530 to gaming device A takes the shortest amount of time.

As discussed above, synchronization of devices participating in a cloud hosted game with a server may be performed by selecting a time to transmit an indication of a shared event from the server on a device-by-device basis. That is, the indications of a shared event may be sent from a server 530 such that they arrive at substantially the same time at each of gaming devices 501A-C. As shown in FIG. 5C, an indication of a shared event may be sent to each of gaming devices 501A-C such that the indications arrive at substantially the same time by selecting the transmission times of the indications based on latencies associated with a respective gaming device. For example, since latency C associated with gaming device 501C is the highest latency, transmission of the indication is first made to gaming device 501C. At a later time, based on the observed latencies, transmission of the indication is made to gaming device 501A, and finally to gaming device 501B. As shown in FIG. 5C, this results in arrival of the indications at all three gaming devices at substantially the same time.

As discussed above, a gaming device may be provided with images that provide visual information indicating a user of the gaming device should wait for the server to provide a further indication or a win or a loss at a subsequent time. Such images may include an animation or other entertainment that is provided to the user while they wait. In the case of gaming devices with different communication latencies, as discussed in relation to FIGS. 5A-C, these image sequences may be of different lengths that are determined based on the latencies.

Figure 6:
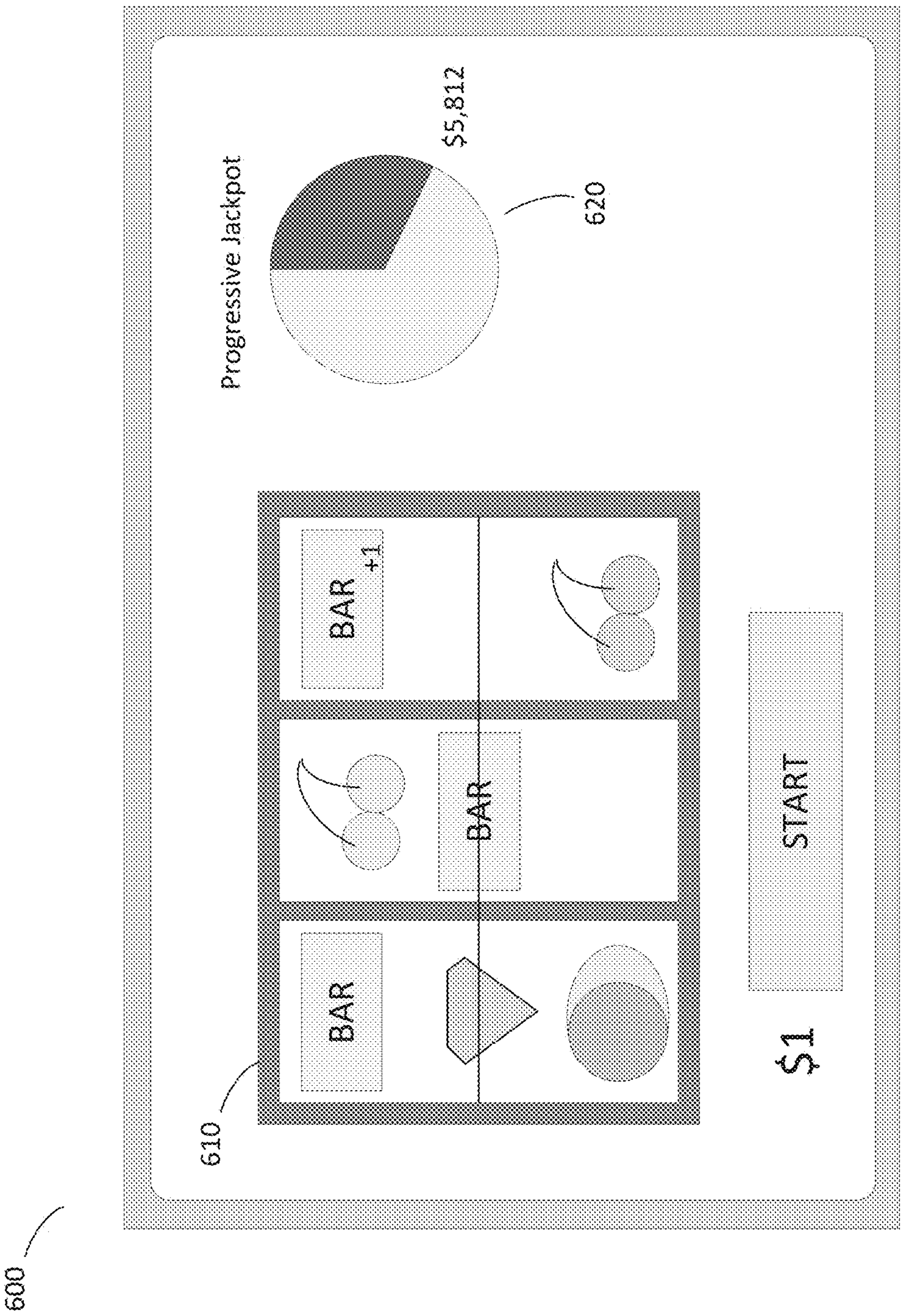
FIG. 6 depicts an illustrative electronic gaming interface, according to some embodiments.

FIG. 6 depicts an illustrative electronic gaming interface, according to some embodiments. Interface 600 includes pay lines 610 and progressive jackpot indication 620. The interface 600 may be displayed in any suitable way on any suitable gaming device, including on a casino gaming machine, on a personal computer and/or on a mobile device. In some cases, the progressive jackpot indication may be displayed on a different display to pay lines 610, such as a display within a casino cabinet that displays pay lines 610 and/or on a display external to the cabinet (e.g., an overhead display in a casino).

As discussed above, interface 600 may be displayed on a suitable gaming device by receiving image data from a game hosting server and by converting the image data into a form suitable for display where necessary. A user activating the "START" button (e.g., by touching the button where interface 600 is displayed on a touch screen, by moving a mouse pointer to the button and clicking the mouse, etc.) may produce user input data that is sent to a game hosting server, which responds with image data representing the state of the game after activation of "START" (e.g., the pay lines 610 may animate, the jackpot meter 620 may increase, a result of the wager may be displayed, or combinations thereof).

Figure 7:
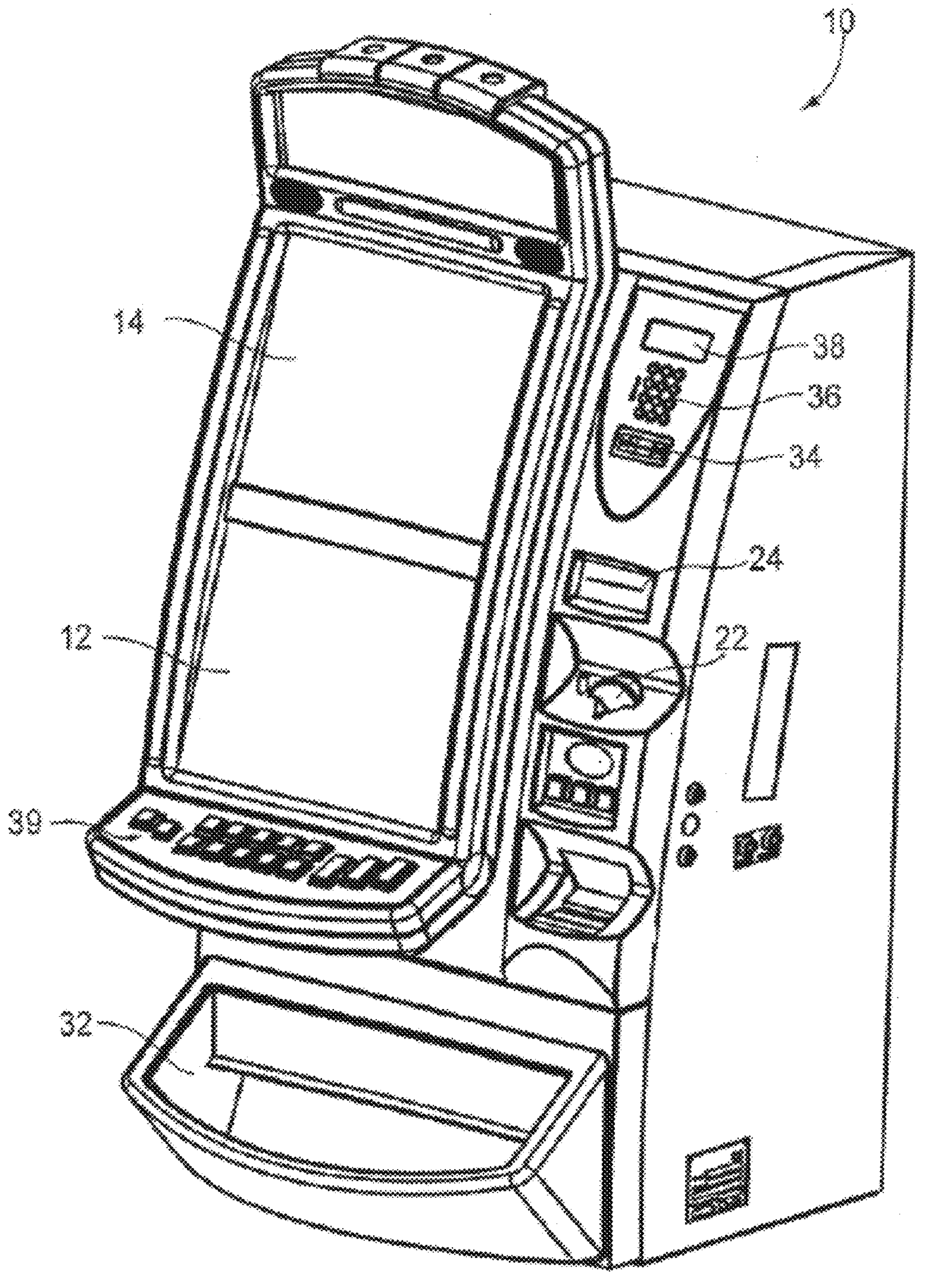
FIG. 7 is a perspective view illustrating an illustrative cabinet housing a casino gaming machine in accordance with some embodiments.

FIG. 7 shows a perspective view of an illustrative cabinet 10 housing a casino gaming machine in accordance with some embodiments. Illustrative cabinet 10, as depicted in FIG. 7, includes a display 12, a second display 14, a coin slot 22, a coin tray 32, a card reader slot 34, a keypad 36, and player control buttons 39.

Displays 12 and 14 may each be any suitable display type such as a thin film transistor (TFT) display, a liquid crystal display (LCD), a cathode ray tube (CRT) display, a light-emitting diode (LED) display, and/or an organic LED (OLED) display.

In some cases, display 12 includes at least one three-dimensional (3D) display for displaying 3D images of one or more 3D environments (e.g., virtual or real-world 3D environments). In some cases, second display 14 may provide game data or other information in addition to the information provided by display 12. Display 14 may provide static information, such as an advertisement for the game, the rules of the game, pay tables, pay lines, and/or other information, and/or may even display the main game or a bonus game along with display 12. Alternatively, the area for display 14 may be a display glass for conveying information about the game.

Display 12 and/or display 14 may have a touch screen lamination that includes a transparent grid of conductors. A player touching the screen may change the capacitance between the conductors, and thereby the X-Y location of the touch on the screen may be determined. A processor within cabinet 10 may associate this X-Y location with a function to be performed. There may be an upper and lower multi-touch screen in accordance with some embodiments.

A coin slot 22 may accept coins or tokens in one or more denominations to generate credits within the casino gaming machine for playing games. An input slot 24 for an optical reader and printer may receive machine readable printed tickets and may output printed tickets for use in cashless gaming.

A coin tray 32 may receive coins or tokens from a hopper (not shown) upon a win or upon the player cashing out. However, in some embodiments, the casino gaming machine may not pay in cash, but may only issue a printed ticket for cashing in elsewhere. Alternatively, a stored value card may be loaded with credits based on a win, or may enable the assignment of credits to an account associated with a computer system, which may be a computer network-connected computer system.

A card reader slot 34 may accept any of various types of cards, such as smart cards, magnetic strip cards, and/or other types of cards conveying machine readable information. The card reader may read the inserted card for player and/or credit information for cashless gaming. The card reader may read a magnetic code on a conventional player tracking card, where the code uniquely identifies the player to the host system. The code may be cross-referenced by the host system to any data related to the player, and such data may affect the games offered to the player by the casino gaming machine. The card reader may also include an optical reader and printer for reading and printing coded barcodes and other information on a paper ticket. A card may also include credentials that enable the host system to access one or more accounts associated with a user. The account may be debited based on wagers by a user and credited based on a win. As discussed above, such accounts may comprise cash or a non-cash currency.

A keypad 36 may accept player input, such as a personal identification number (PIN) and/or any other player information. A display 38 above keypad 36 may display a menu for instructions and/or other information, and/or may provide visual feedback of the keys pressed. The keypad 36 may be an input device such as a touchscreen, or dynamic digital button panel, in accordance with some embodiments.

Player control buttons 39 may include any buttons and/or other controllers usable for the play of the particular game or games offered by the casino gaming machine, including, for example, a bet button, a repeat bet button, a spin reels (or play) button, a maximum bet button, a cash-out button, a display pay lines button, a display payout tables button, select icon buttons, and/or any other suitable button(s). In some embodiments, buttons 39 may be replaced by a touch screen with virtual buttons. In some embodiments, touchless control gesture functionality may replace or coexist with buttons 39.

Figure 8:
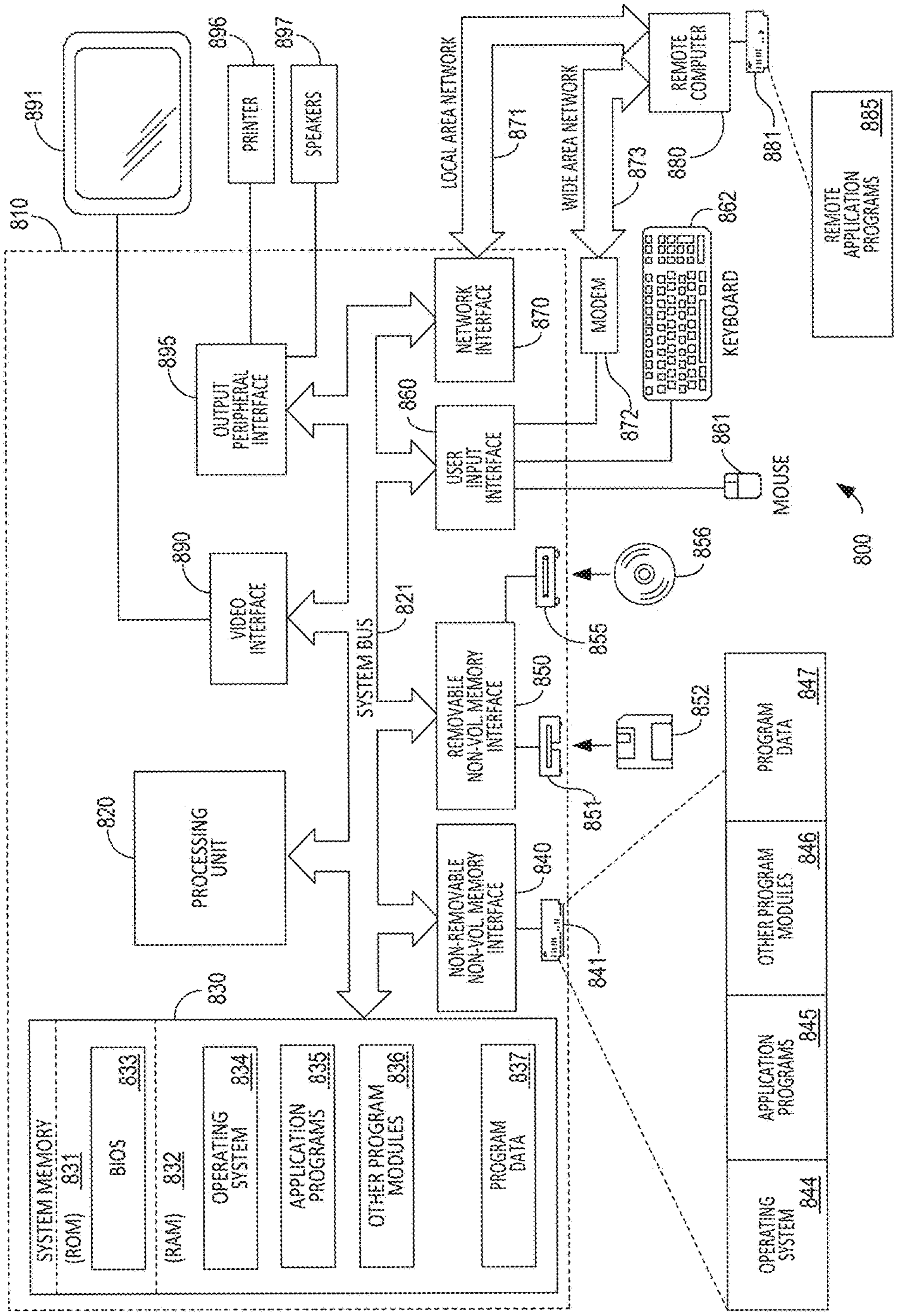
FIG. 8 illustrates an example of a computing system environment on which various embodiments may be implemented.

FIG. 8 illustrates an example of a suitable computing system environment 800 on which the technology described herein may be implemented. The computing system environment 800 is only one example of a suitable computing environment and is not intended to suggest any limitation as to the scope of use or functionality of the technology described herein. Neither should the computing environment 800 be interpreted as having any dependency or requirement relating to any one or combination of components illustrated in the illustrative operating environment 800.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 8, an illustrative system for implementing the technology described herein includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are illustrative and other means of establishing a communications link between the computers may be used.

Having thus described several aspects of at least one embodiment, it is to be appreciated that various alterations, modifications, and improvements will readily occur to those skilled in the art.

Such alterations, modifications, and improvements are intended to be part of this disclosure, and are intended to be within the spirit and scope of the disclosure. Further, though advantages are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rackmounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, embodiments may be implemented as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various embodiments as discussed above. As used herein, the term "computer-readable storage medium" encompasses only a non-transitory computer-readable medium that can be considered to be a manufacture (i.e., article of manufacture) or a machine. Alternatively or additionally, embodiments may be implemented as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various embodiments as discussed above. Additionally, it should be appreciated that according to one aspect of this embodiment, one or more computer programs that when executed perform methods need not reside on a single computer or processor, but may be distributed in a modular fashion amongst a number of different computers or processors to implement various embodiments.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various embodiments may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments may be implemented as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a casino game at a plurality of gaming devices, comprising:

by a server comprising at least one processor:

obtaining a first indication of communication latency from the server to a first gaming device of the plurality of gaming devices and a second indication of communication latency from the server to a second gaming device of the plurality of gaming devices;

receiving first user input data from the first gaming device, the first user input data being indicative of a wager for a first instance of the casino game;

determining an outcome for the first instance of the casino game based at least in part on the wager for the first instance of the casino game;

sending first image data to the first gaming device through wired communication channels at a first transmission time based on the first indication of communication latency such that the first image data arrives at the first gaming device at substantially a receipt time, the first image data including one or more visual indications of the outcome for the first instance of the casino game; and sending second image data to the second gaming device through at least one wireless communication channel at a second transmission time based on the second indication of communication latency such that the second image data arrives at the second gaming device at substantially the receipt time.

2. The method of claim 1, further comprising:

receiving second user input data from the second gaming device, the second user input data being indicative of a wager for a second instance of the casino game; and determining an outcome for the second instance of the casino game based at least in part on the wager for the second instance of the casino game, wherein the second image data includes a visual indication of the outcome for the second instance of the casino game.

3. The method of claim 1, wherein the first and second transmission times are further determined based on a highest communication latency of the first and second indications of communication latency.

4. The method of claim 1, further comprising, by the server:

receiving, from the first gaming device, authentication information associated with a user account; and identifying, based at least in part on the received authentication information, an account balance associated with the user account.

5. The method of claim 4, further comprising, by the server, adjusting the identified account balance based at least in part on the wager for the first instance of the casino game.

6. The method of claim 1, further comprising, by the server, determining the wager for the first instance of the casino game based on display coordinates indicated by the first user input data.

7. The method of claim 1, further comprising, by the server, scaling the first image data based on a display resolution of the first gaming device.

8. The method of claim 1, wherein the first image data comprises image data for only a portion of a display of the first gaming device.

9. The method of claim 1, wherein the first gaming device and the second gaming device are each a type of gaming device selected from the group consisting of: a casino gaming machine, a personal computer and a mobile device, and wherein the type of gaming device of the first gaming device and the type of gaming device of the second gaming device are different.

10. The method of claim 9, wherein the first gaming device is a casino gaming machine and the second gaming device is a mobile device.

11. The method of claim 1, further comprising rendering the first and second image data by the server.

12. A server system for operating a casino game playable at a plurality of gaming devices, the server system comprising:

at least one communication interface configured to communicate with the plurality of gaming devices;

at least one processor; and at least one processor-readable storage medium comprising processer-executable instructions that, when executed, cause the at least one processor to:

obtain a first indication of communication latency from the server to a first gaming device of the plurality of gaming devices and a second indication of communication latency from the server to a second gaming device of the plurality of gaming devices;

receive first user input data from the first gaming device, the first user input data being indicative of a wager for a first instance of the casino game;

determine an outcome for the first instance of the casino game based at least in part on the wager for the first instance of the casino game; and send first image data to the first gaming device through wired communication channels at a first transmission time based on the first indication of communication latency such that the first image data arrives at the first gaming device at substantially a receipt time, the first image data including one or more visual indications of the outcome for the first instance of the casino game; and send second image data to the second gaming device through at least one wireless communication channel at a second transmission time based on the second indication of communication latency such that the second image data arrives at the second gaming device at substantially the receipt time.

13. The server system of claim 12, wherein the processor-executable instructions, when executed by the at least one processor, further cause the at least one processor to:

receive second user input data from the second gaming device, the second user input data being indicative of a wager for a second instance of the casino game; and determine an outcome for the second instance of the casino game based at least in part on the wager for the second instance of the casino game, wherein the second image data includes a visual indication of the outcome for the second instance of the casino game.

14. The server system of claim 12, wherein the first and second transmission times are further determined based on a highest communication latency of the first and second indications of communication latency.

15. The server system of claim 12, wherein the processor-executable instructions, when executed by the at least one processor, further cause the at least one processor to render at least the first image data.

16. The server system of claim 12, wherein the processor-executable instructions, when executed by the at least one processor, further cause the at least one processor to scale the first image data based on a display resolution of the first gaming device.

* * * * *